(No Model.)
L. SCHULTZ.
APPARATUS FOR OBTAINING EXTRACTS.
No. 417,096. Patented Dec. 10, 1889.
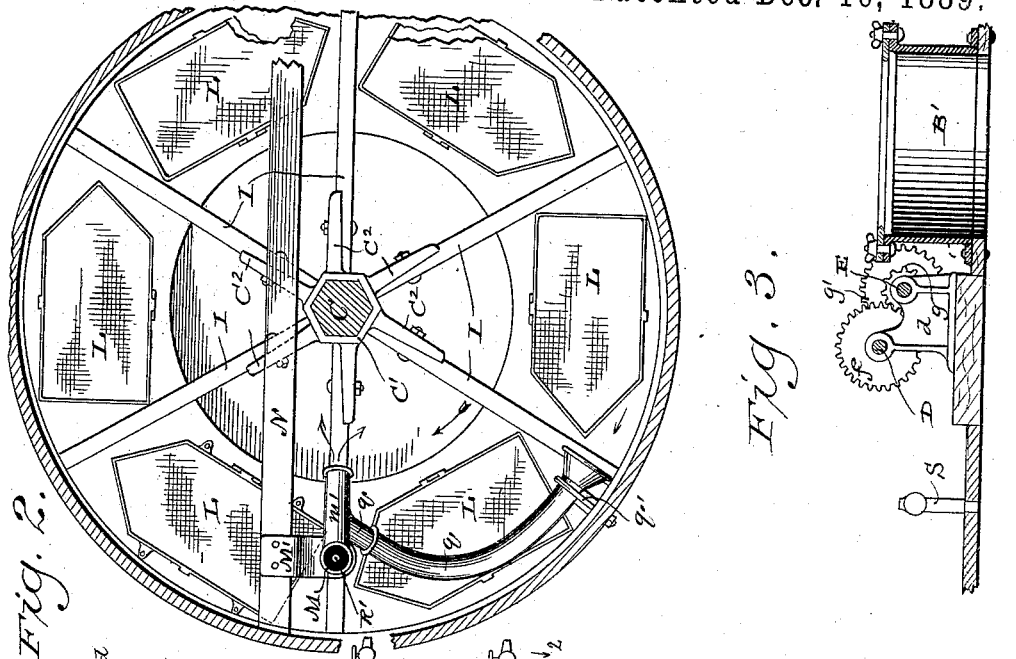
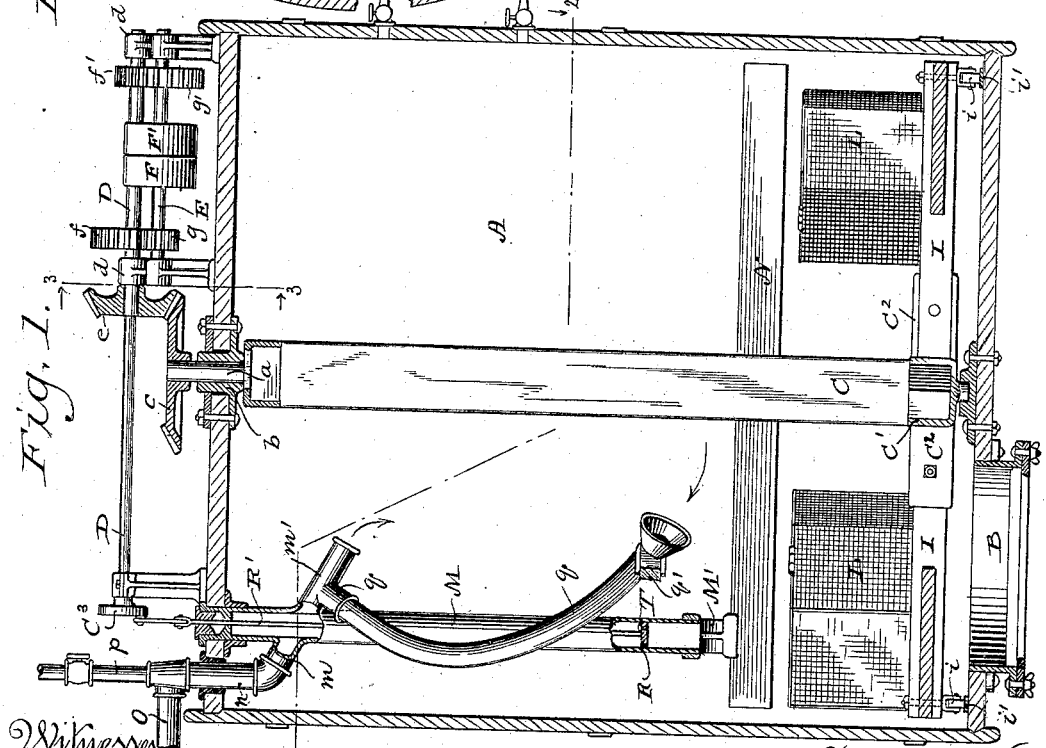

UNITED STATES PATENT OFFICE.

LOUIS SCHULTZ, OF RACINE, WISCONSIN.

APPARATUS FOR OBTAINING EXTRACTS.

SPECIFICATION forming part of Letters Patent No. 417,096, dated December 10, 1889.

Application filed May 24, 1889. Serial No. 311,947. (No model.)

*To all whom it may concern:*

Be it known that I, LOUIS SCHULTZ, of Racine, in the county of Racine, and in the State of Wisconsin, have invented certain new and useful Improvements in Apparatus for Obtaining Extracts from Gambier and other Substances; and I do hereby declare that the following is a full, clear, and exact description thereof.

My invention relates to machines for obtaining extracts from gambier, sumac, and other and like substances, and will be fully described hereinafter.

In the drawings, Figure 1 is a central vertical section of my device; Fig. 2, a section on line 2 2, Fig. 1; and Fig. 3 is a detail section on line 3 3, Fig. 1.

A is a tank having an outlet B at its bottom and a man-hole B' at its top.

C is a shaft that is stepped in the bottom of the tank, and has a journal $a$, that passes through a bearing $b$ in the top of the tank, which journal carries a bevel-wheel $c$.

D is a shaft that is journaled in bearings $d$ $d$ on top of the tank, and this shaft carries a bevel-pinion $e$, that meshes with bevel-wheel $c$. Shaft D also carries pinions $f f'$, that mesh, respectively, with pinions $g$ $g'$ of a pulley-shaft E, that is journaled in bearings on the top of the tank. One of the pulleys F of shaft E is tight and the other loose, and the shaft D is driven by a belt (not shown) that passes around the pulley F, and which may be shifted to the pulley F' when the machine is to be stopped.

The shaft C carries a bracket C' on its lower end, and this bracket is formed with channeled arms C², in which are fixed the inner ends of radial arms I, and the outer ends of these arms are supported by rollers $i$, that travel on a way $i'$ on the bottom of the tank. These arms carry an annular platform that in turn carries gauze cages L, having hinged covers and prow-shaped front ends, and in these cages is placed the bark or other material to be steeped or from which the extract is to be obtained.

M is a cylinder that is suspended from the top of the tank with its lower end passing through and supported by a bracket M', that in turn is supported by a cross-bar N, that is secured to the sides of the tank at each end. An arm $m$ of this cylinder is coupled to a pipe $n$, that extends up through the top of the tank, and this pipe $n$ receives a water-supply pipe O, and a pipe $p$, that leads from the exhaust of an engine or other steam supply. Another arm $m'$ leads from cylinder M into the tank near its upper end, and from this arm a branch pipe $q$ extends in a downward circular direction, its lower end, which is open and flared, being secured to the side of the tank at $q'$. A pump-piston R, which may be provided with an ordinary clack-valve T, is fitted in the cylinder M, and its stem R' extends up through a bushing in the top of the tank, when it is linked to a crank or wrist wheel C³ on shaft D, so that when the latter is in motion it will reciprocate the piston and cause it to pump fluid from the lower portion of the tank and discharge it through arm $m'$ with the steam from pipe $p$. The tank may be supplied with an ordinary pressure-gage S.

The operation of my device is as follows: The material from which the extract is to be obtained usually contains a great deal of foreign matter—such as straw, chips, and stones. This is all placed in the cages, the doors closed, and the machinery started after the water and steam cocks have been opened, and then, after sufficient water has been admitted, the water-cock is closed. Now, as the shaft D is revolved it turns shaft C, and also operates the pump-piston, which draws the water from the bottom of the tank to arm $m'$, out of which it is discharged with the exhaust-steam, and at the same time the centrifugal force created by the revolving cages throws the water into branch $q$ of arm $m'$, and as these streams meet the steam from the steam-pipe they take up the heat from the steam, and thus the water in the tank is gradually raised to the temperature of the steam, at which temperature it remains until the desired substance is all extracted from the material in the cages.

In addition to forming a support for the lower end of cylinder M, the bar N serves as a stirrer by intercepting the current made by the revolving cages.

The vat is closed during the process of extracting.

Having thus fully described my invention, what I claim as new, and desire to secure by Letters Patent, is—

1. The combination, in a suitable tank, of a shaft and driving mechanism therefor, a horizontal frame carried by said shaft and supported at its ends by the bottom of the tank, and cages carried by said frame, substantially as described, and for the purpose set forth.

2. The combination, in the tank, of a cylinder, and the steam and water supply pipe which is coupled to said cylinder, a single outlet for the steam and water supply and cylinder into the tank, and a pump-piston fitted in said cylinder, and means for operating it, substantially as described.

3. In a tank, the combination, with the cages and their revolving supports, of a pump-cylinder, and the steam and water pipes leading into and through it, and a branch pipe extending from the cylinder-outlet and adapted to convey water from the lower portion of the tank to the cylinder-outlet and into contact with the entering steam, substantially as set forth.

In testimony that I claim the foregoing I have hereunto set my hand, at Racine, in the county of Racine and State of Wisconsin, in the presence of two witnesses.

LOUIS SCHULTZ.

Witnesses:
S. S. STOUT,
E. W. STOUT.